United States Patent [19]
Imaseki

[11] Patent Number: 5,294,871
[45] Date of Patent: Mar. 15, 1994

[54] ELECTRIC MOTOR CONTROL SYSTEM

[75] Inventor: Takashi Imaseki, Zushi, Japan

[73] Assignee: Nissan Motor Company, Ltd., Yokohama, Japan

[21] Appl. No.: 926,670

[22] Filed: Aug. 10, 1992

[30] Foreign Application Priority Data

Aug. 9, 1991 [JP] Japan .................. 3-200818

[51] Int. Cl.$^5$ .................. H02P 7/68
[52] U.S. Cl. .................. 318/139; 318/433; 388/815
[58] Field of Search .............. 318/139, 432, 433, 268, 318/269, 270, 271, 273, 274, 276, 461, 465; 388/816, 809, 815, 823, 844, 847, 907.5; 180/60, 65.1, 65.8

[56] References Cited
U.S. PATENT DOCUMENTS

| | | |
|---|---|---|
| 3,349,309 | 10/1967 | Dannettell . |
| 4,096,418 | 6/1978 | Marumoto et al. .................. 318/12 |
| 4,500,820 | 2/1985 | Noto et al. .................. 318/139 |
| 4,803,409 | 2/1989 | Horikawa .................. 318/13 X |

FOREIGN PATENT DOCUMENTS

63-149105 9/1988 Japan .

Primary Examiner—Bentsu Ro
Attorney, Agent, or Firm—Lowe, Price, LeBlanc & Becker

[57] ABSTRACT

A control system for an electric vehicle comprises a motor speed detector and a sensor for detecting an accelerator angle and outputting a motor speed error command based on the difference between motor speed and a speed required by the present accelerator angle. A motor speed command is generated based on the error command and the detected motor speed. A feedback control portion outputs a torque command based on the motor speed command and the detected motor speed and the driving force of the motor is controlled based on the torque command.

8 Claims, 8 Drawing Sheets

FIG. 9 PRIOR ART

ELECTRIC MOTOR CONTROL SYSTEM

BACKGROUND OF THE INVENTION

1. Field of the Invention

The present invention relates to a motor control for a motor used as a prime mover of a vehicle.

2. Description of the Prior Art

Motor control of the above-mentioned kind may be divided into one type of control wherein motor torque is used as a variable to be adjusted, namely a torque control, and another wherein a motor revolution at speed is used as a variable to be adjusted, namely a speed control. The torque control is in most cases employed to meet demands of a driver.

If, for example, motor control is to be combined with a so-called Automatic Speed Control Device (ASCD) or it is to be so modified as to depend on a vehicle speed of another vehicle moving ahead, control based on motor speed is needed. Such speed control is also needed in a case where left and right wheels are driven by different motors so as to adjust a speed difference between the left and right wheels thereby to give a so-called Limited Slip Differential (LSD) effect. Thus, there is a demand for a motor systems which can shift between torque control and speed control.

Figure 9:
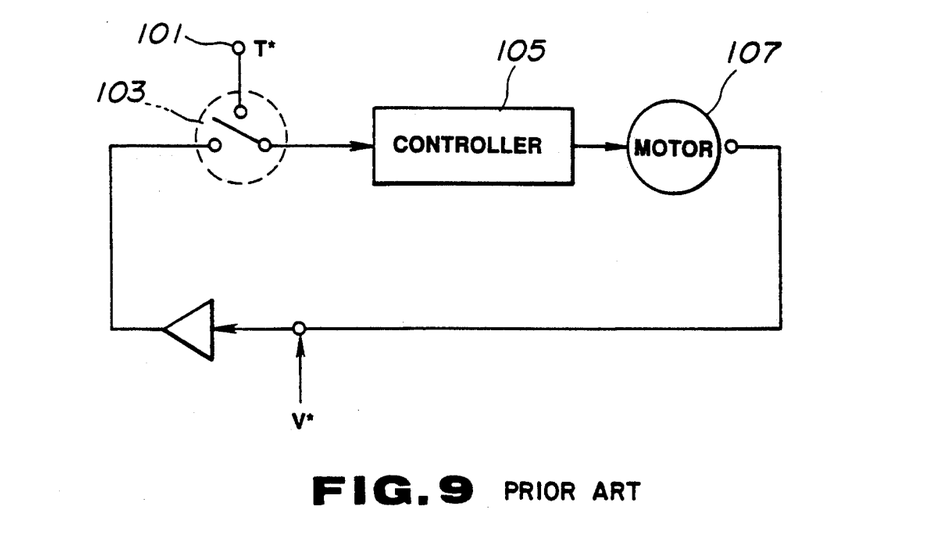
FIG. 9 is a schematic diagram of a conventional control system.

FIG. 9 is a schematic illustrating a conventional motor control arrangement for a motor 107 used as a prime mover of a vehicle. In this system, torque control is employed wherein a torque demand signal T* generated in response to operation of an accelerator 101 is used as a variable to be adjusted. In this case, the torque demand signal T* is supplied to a controller 105. The controller 105 effects an open loop control wherein a motor torque generated by the motor 107 approaches a target value as represented by the torque demand signal T*. If control based on motor speed is required, a switch 103 is operated to take a position wherein instead of the torque demand signal T* a deviation between a desired motor speed signal V* and an actual motor speed, as detected, of the motor 107 is supplied to the controller 105. Then, the controller 105 effects a closed loop control, i.e., feedback control, wherein the motor 107 is controlled in such a direction as to reduce the deviation toward zero.

This motor control has an insufficiency in that there occurs a shock upon making a shift to the torque control mode from the speed control mode, resulting in a—a poor ride feel of the vehicle. This is because closed loop control is interrupted and replaced by the open loop control at the time of shifting and a rapid change in control gain occurs.

Another approach to effect a smooth shift between torque control and speed control is proposed in Japanese Utility Model Application First Publication 63-149105. According to the motor control system disclosed in this Publication, instead of a closed loop control, an open loop control is used to effect motor speed control wherein a running resistance is anticipated in response to a change in motor speed and outputted in terms of torque in such a manner as to keep the motor at about a desired value. Specifically, an accelerator position, a brake position and a motor speed are used for calculation of an electric current amplitude and a torque angle. These values are used as target values. There are calculated instruction values which gradually approach the above target values, respectively. Torque control of the motor is effected based on these instruction values. This known approach is successful in making a smooth shift between torque control and speed control.

However, this known motor control cannot keep the speed at a desired speed value when the vehicle encounters a change in road conditions, such as when moving uphill. Thus, the functions performed by ASCD and LSD cannot be realized in the known motor control.

Accordingly, an object of the present invention is to provide motor control which effects smooth shift between torque control and speed control of a motor and which is capable of realizing the functions of ASCD and LSD.

SUMMARY OF THE INVENTION

According to the present invention, there is provided a control system for a motor of a vehicle, comprising: means for detecting motor speed and outputting a motor speed signal indicative thereof; means for detecting a demand for acceleration and outputting an acceleration signal indicative thereof; means for calculating a motor speed error signal based on the motor speed signal and the acceleration signal and outputting a motor speed error signal; means for generating a motor speed command signal and outputting a motor speed command signal indicative thereof; feedback control means calculating a torque command value based on the motor speed command signal and the motor speed signal and outputting a torque command signal indicative thereof; and control means, controlling the motor on the basis of the torque command signal from the motor speed feedback control means.

DESCRIPTION OF THE PREFERRED EMBODIMENT

Figure 1:
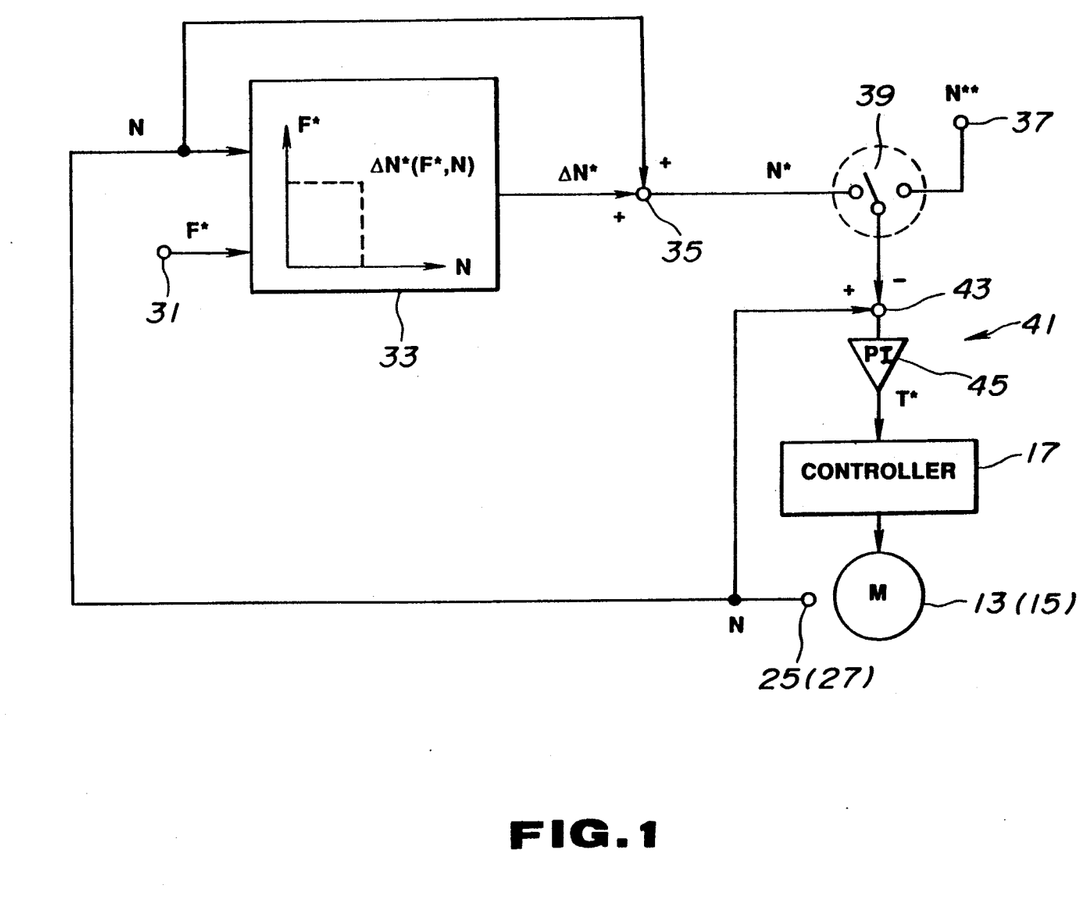
FIG. 1 is a schematic diagram of a first embodiment of a motor control system according to the present invention.
Figure 2:
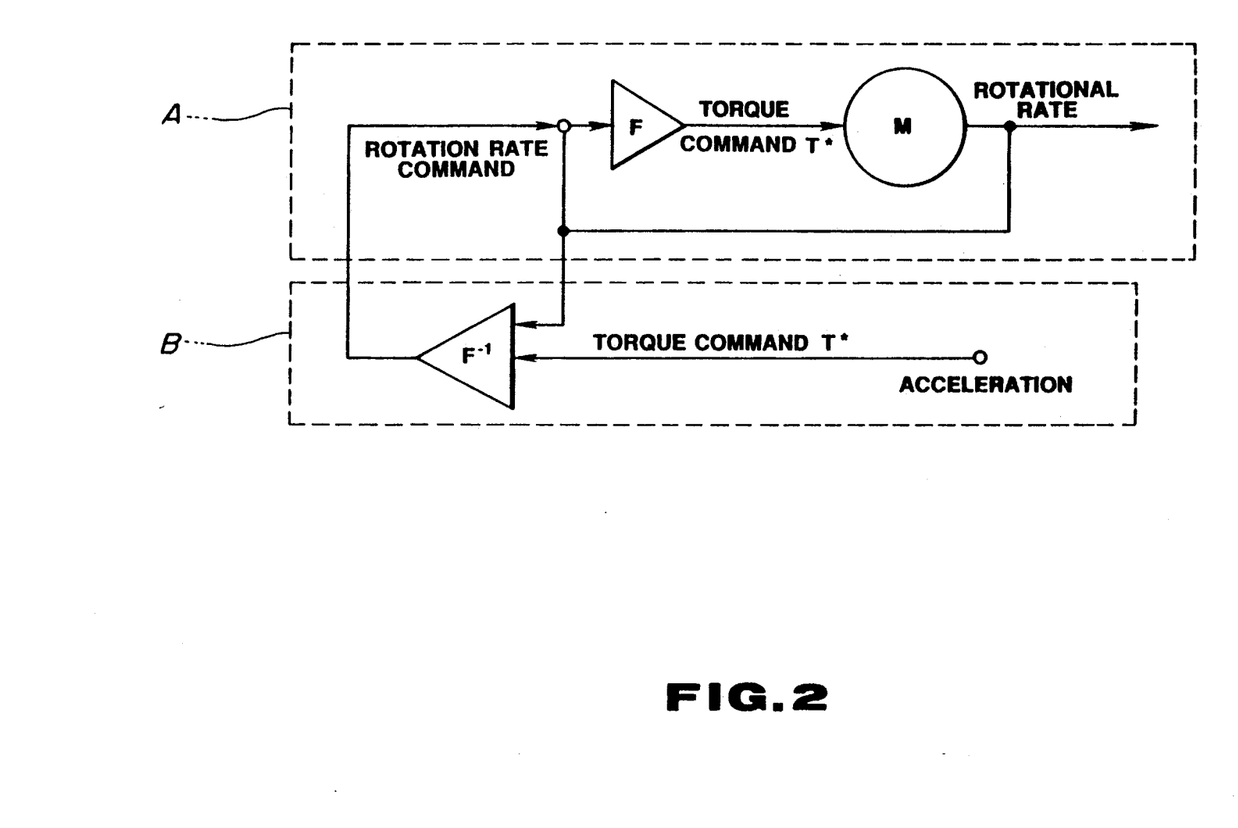
FIG. 2 is a schematic diagram illustrating the operation of the first embodiment.
Figure 3:
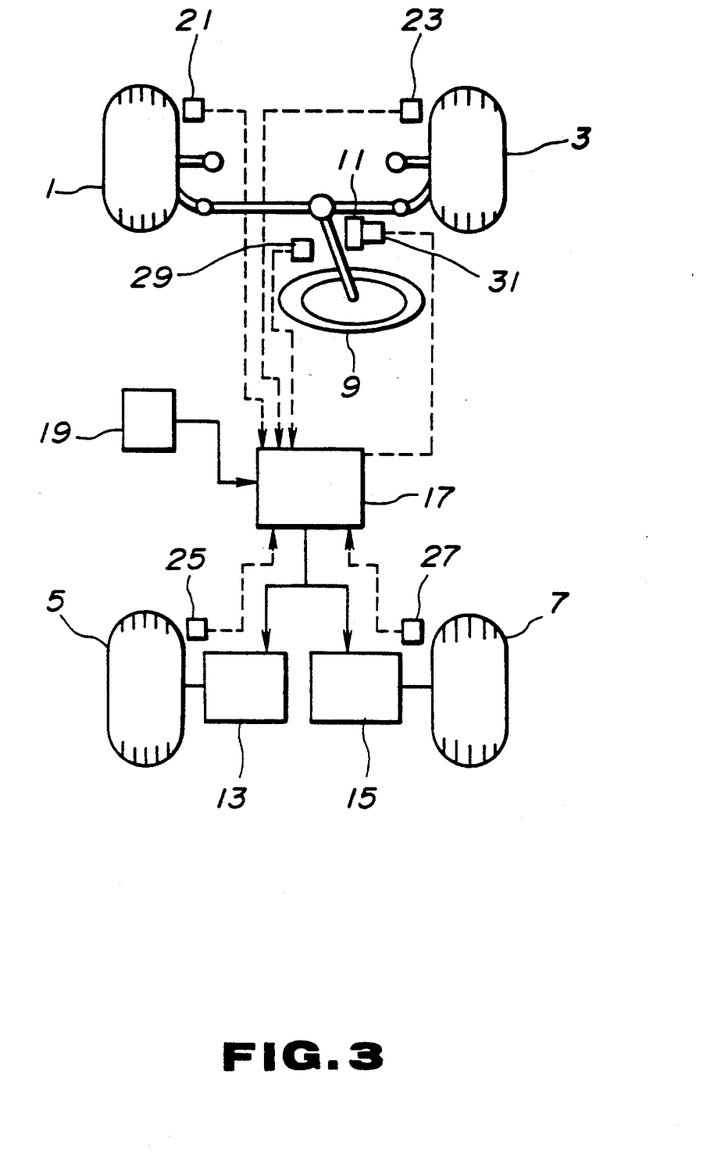
FIG. 3 is a schematic diagram showing installation of the motor control system in a vehicle.

Referring now to the drawings, particularly to FIGS. 1-3, FIG. 1 shows a schematic diagram of a first embodiment of a control system according to the invention. FIG. 2 shows an operational concept of the first embodiment and FIG. 3 shows the components of the first embodiment as installed on a vehicle.

Referring to FIG. 3, a vehicle is shown in which left and right front wheels 1 and 3, left and right rear wheels 5 and 7, a steering wheel 9, and an accelerator 11 are provided. Motors 13 and 15 are respectively associated with the left rear wheel 5 and the right rear wheel 7. When the front wheels 1 and 3 are steered by the steering wheel 9, depending on the steering direction, a controller 17 is active to supply driving force signals to the motors 13 and 15 respectively according to the steering condition.

Further, a lateral acceleration sensor 19, front wheel speed sensors 21 and 23, means for detecting a motor speed by way of rear wheel rotation, motor rotational speed sensors 25 and 27, a steering angle sensor 29 and accelerator angle sensor 31 are further provided.

The lateral acceleration sensor 19 detects a lateral acceleration acting on the vehicle and outputs a lateral acceleration indicative signal $Y_G$ indicative thereof. The front wheel speed sensors 21 and 23 respectively detect the rotation speeds of the front wheels 1 and 3 and output wheel speed signals Nfr and Nfl respectively by indicative of detected right and left front wheel speeds. The motor speed sensors 25 and 27 respectively detect left and right motor rotation speeds and output motor speed signals Nr and Nl. The steering angle sensor 29 detects a steering angle of the steering wheel 9 and outputs a signal $\theta$ indicative thereof and, the accelerator angle sensor 31 detects an opening, or depressed, angle of the accelerator 11 and outputs an acceleration command signal F*.

The outputs of the above-described sensors 19-31 are supplied to the controller 17.

As shown in FIG. 1, this embodiment of a motor control system comprises a motor speed error command generator 33, a motor speed command generator 35, an external motor speed command generator 37, a change-over switch 39, a motor speed feedback control unit 41, and a controller 17.

In response to the motor speed signal N of the motor speed sensor 25 (or 27) and the acceleration command signal F* of the accelerator sensor 31, the motor speed error command signal 33 outputs a motor speed error command value delta N* which is determined as a predetermined function of F* and N. The motor speed command generator 35 calculates a sum of the motor speed error command delta N* and the motor speed N and outputs a motor speed command value N* indicative of the calculated sum. The external motor speed command generator 37 generates a motor speed command value N**. The motor speed command values N* and N** are selected by the change-over switch 39. When the change-over switch 39 takes one of two shiftable positions, the motor speed command signal N* is outputted by the change-over switch 39, while when it takes the other position, the motor speed command signal N** is outputted by the change-over switch 39. The output of the change-over switch 39 and the motor speed signal N generated by the motor speed sensor 25 (or 27) are supplied to the motor speed feedback control unit 41 where a feedback control on the N* (or N**) and N is carried out. Based on the output of the feedback control unit 41, the controller 17 controls torque of the motor 13 (or 15).

The feedback control unit 41 includes a subtractor 43 at which a subtraction N−N* or N−N** is made. Based on this subtraction Proportional, Integral and Differential terms (P. I. D) are calculated and their sum is outputted as a torque command value T* by a torque command generator 45.

The operation of this embodiment will be described in detail hereinbelow.

Usually, the motor 13 (or 15) is controlled in response to the torque command value T* such that the difference between the motor speed N detected at the motor speed sensor 25 (or 27) and the motor speed command value N* decreases toward zero.

As previously described, the motor speed command value N* is a sum of the actually detected motor speed N and the motor speed error command value delta N* that is given as the predetermined function of the actually detected motor speed N and the acceleration command value F* generated by the accelerator sensor 31. This control may be divided into two blocks A and B as shown in FIG. 2.

Referring to FIG. 2, in the A block, the subtractor 43 and the torque command generator 45 (see FIG. 1) are represented by a speed to torque command converter F, while in the block B, the accelerator sensor 31, the motor speed error command generator 33 and the motor speed command generator 35 (see FIG. 1) are represented by an inverter $F^{-1}$. As will now be readily seen from FIG. 2, the motor speed command is cancelled owing to the fact that $F F^{-1}=1$. As a result, it is considered that the stable speed control is controlled by the torque control that provides good driveability.

From the previous description, it will now be appreciated that although the circuit structure is of the speed control type, it is rendered to operate as a torque control system. Thus, upon inputting the completely different motor speed command value N** via the change-over switch 39 disposed downstream of the motor speed command generator 35, this change in motor speed command, namely a change from N* to N**, occurs outside of the feedback loop so that the motor speed feedback control unit 41 reacts smoothly based on this change in motor speed command value to provide a smooth shift in speed of the motor 13 (or 15).

In the above-described embodiment, the motor speed error command value delta N* is calculated based on the actual motor speed N and the accelerator command signal F*. If it is desired to increase control response during transient period, the motor speed error command value delta N* is determined as a sum of a proportional term, as expressed by C1×F*, and a differential term, as expressed by C2×F*, where: C1 and C2 are constants, and $\dot{F}^*$ (F* overdot) is a first differential with respect to time. Thus, response characteristic to a rapid change in acceleration command is improved.

Figure 4:
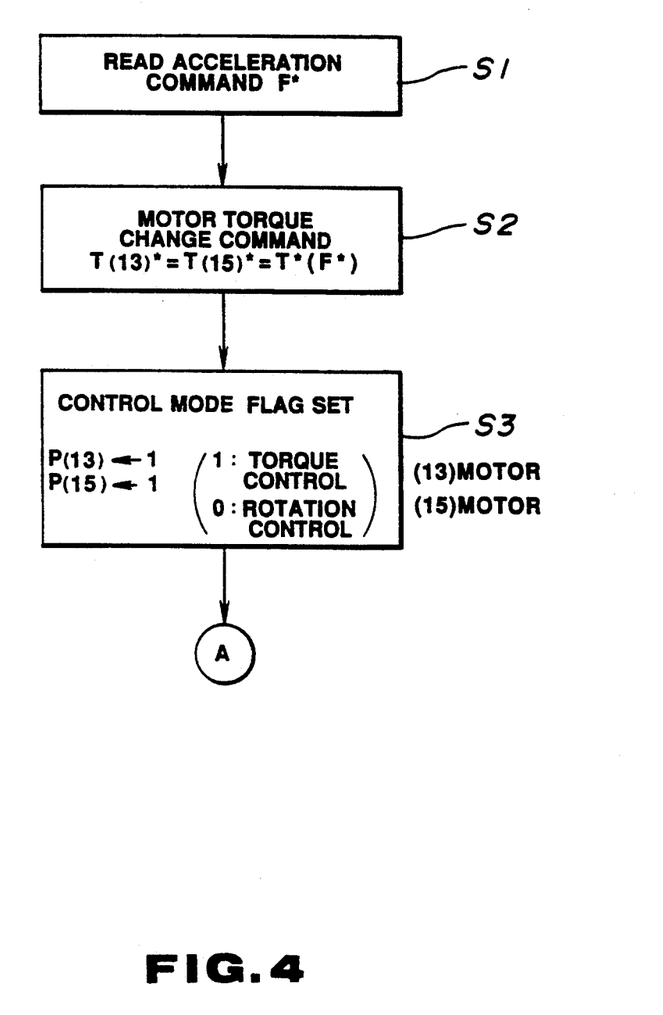
FIGS. 4, 5 and 6 show a flowchart performing the function of limited slip differential (LSD)

Hereinafter, referring to the flowchart shown in FIGS. 4-6, it is described how the motor control system performs the function of limited slip differential (LSD).

First, at a step S1, a acceleration command value F* is read from the accelerator sensor 31. Then, at a step S2, based on the acceleration command read at step S1, a motor torque command value for the motor 13, namely T*(13) and a motor torque command value for the motor 15, namely T*(15), are modified. It is now assumed that T*(13)=T*(15)=T*.

Then, at a step S3, control procedure flags P(13) and P(15) are set equal to 1 (one). The setting is such that the flag P(13) or P(15) being equal to 1 indicates torque control, while it being 0 (zero) means speed control. Usually priority is placed on torque control so that the flags P(13) and P(15) for the motors 13 and 15 are set to 1 (one), respectively.

Figure 5:
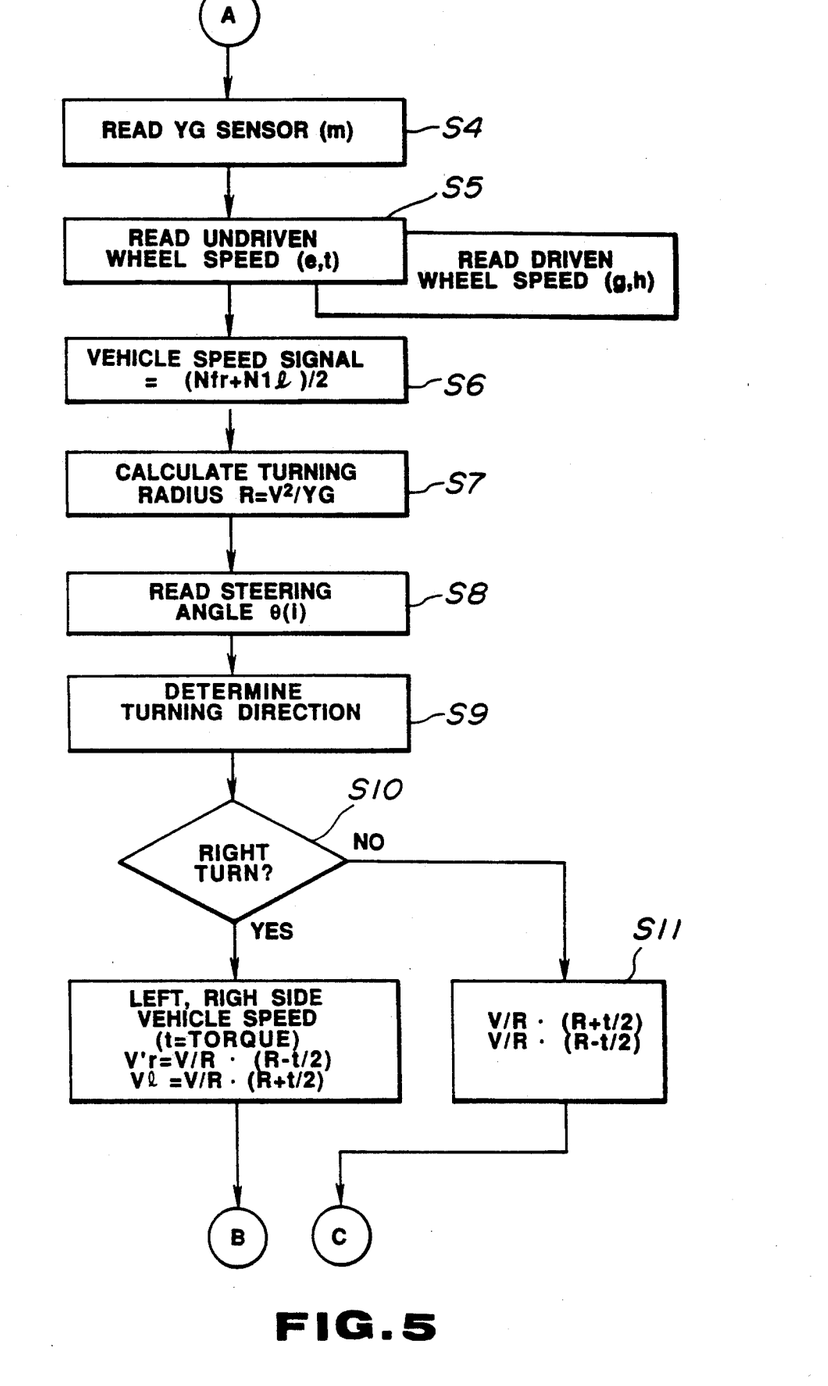

Then, referring to FIG. 5, at a step S4, a lateral acceleration $Y_G$ is read from the lateral acceleration sensor 19. At a step S5, a right front wheel speed Nfr and a left front wheel speed Nhl of the right and left front wheels 1 and 3 are respectively read from the front wheel speed sensors 21 and 23, an actual right rear wheel speed Nr and an actual left rear wheel speed Nl of the right and left rear wheels 5 and 7 are read from the motor speed sensors 25 and 27. Then, at a step S6, the vehicle speed V is calculated from the values Nfr and Nfl. At a step S7, using this vehicle speed V and the lateral acceleration $Y_G$, a turning radius R of the vehicle is calculated. Alternatively, the turning radius R is determined using a steering wheel angle $\theta$ instead of the lateral acceleration $Y_G$.

At a step S8, a steering wheel angle $\theta$ is read from the steering wheel angle sensor 29 and a direction of turning is determined based on whether the steering wheel angle $\theta$ is positive or negative.

Then, at a step S10, it is determined whether the turning is a right turn or not. If a right turn is made, the routine proceeds to step S11a and right and left vehicle speeds Vr and Vl are calculated as follows:

$$Vr = V/R\ (R - t/2)$$

$$Vl = V/R\ (R + t/2).$$

If a left turn is made, the routine proceeds to a step S11b and right and left vehicle speeds Vr, Vl are calculated as follows:

$$Vr = V/R\ (R + t/2)$$

$$Vl = V/R\ (R - t/2)$$

t = tread.

Figure 6:
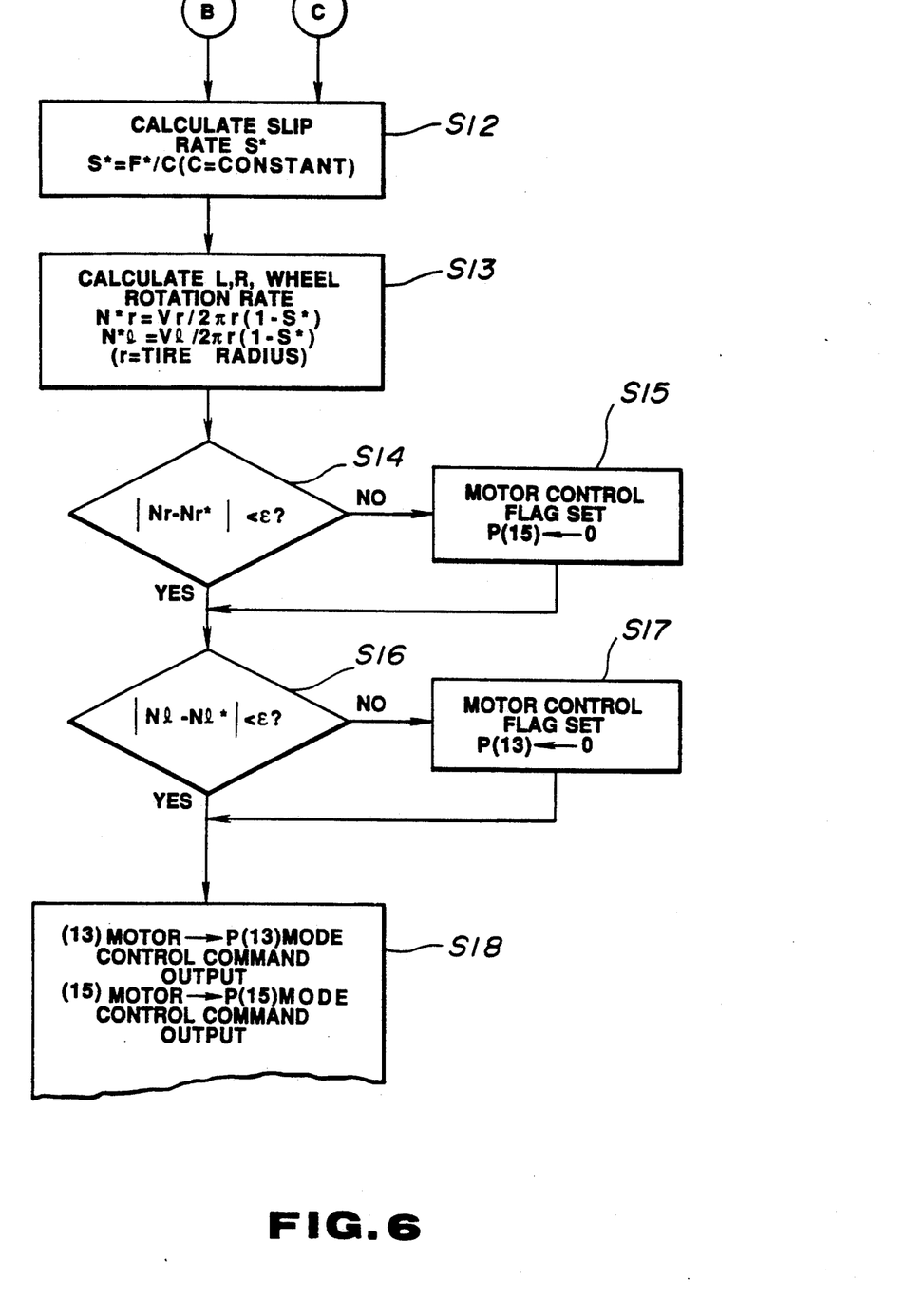

Then, at a step S12, as seen S12, as seen in FIG. 6, a slip rate command S* is calculated according to the following equation: S* = F*/C, C being a constant.

Then at a step S13, right and left wheel revolution speeds Nr*, Nl* for the left and right rear wheels 5, 7 are calculated as follows:

$$Nr^* = Vr/2\pi r\ (1 - S^*)$$

$$Nl^* = Vl/2\pi r\ (1 - S^*)$$

wherein r = a tire radius.

Then, in a step S14, it is determined whether an actual speed of the rear right wheel 7 is greater than a predetermined value $\epsilon$ or not, according to the following equation: $|Nr - Nr^*| < \epsilon$. A value of $Nr - Nr^*$ which is greater than $\epsilon$ indicates a degree of slip is above a set amount.

Therefore, if the answer is NO in step S14, the routine proceeds to a step S15, wherein the motor control flag P(15) for the motor 15 is set to P(15)=0 (0=revolution speed control) after which the routine proceeds to a step S18.

On the other hand, if the result of calculation shows that Nr−Nr* is less than $\epsilon$, or a YES answer is determined in step S14, the motor control status of the motor 15 is not changed and the routine proceeds directly to step S16 wherein it is determined whether an actual speed of the rear left wheel 5 is greater than a predetermined value $\epsilon$ or not, according to the following equation: $|Nl - Nl^*| < \epsilon$. A value of Nl−Nl* greater than $\epsilon$ indicating a degree of slip is above a set amount.

If the answer is NO in step S16, the routine proceeds to a step S17, wherein the motor control flag P(13) for the motor 13 is set to P(13)=0 (0=revolution speed control) and the routine proceeds to a step S18. It will be noted that if the calculation of N(r or l)−N(r or l)* is less than $\epsilon$ then slip outside of the predetermined slip range is not present and the control mode flags P(13) and P(15) for the motors 13, 15 are set at 1.

At step S18 motor control commands Motor 13 control mode=P(13)=(0 or 1) and Motor 15 control mode=P(15)=(0 or 1) are output for each of the motors 13, 15, are output according to the determinations made in steps S14 to S17. It will be noted that if the value of the motor control flags P(13) or P(15) are set to 0 in steps S15 or S17, then the switching element 39 of the control circuit is switched to effect change of the control mode from torque control (value 1) to revolution speed control (value 0).

According to the above-described embodiment, wherein control of the motors 13, 15 is effected according to a difference in detected speeds of right and left rear wheels 5, 7, a so-called L.S.D. (limited slip differential) effect is obtained.

Figure 7:
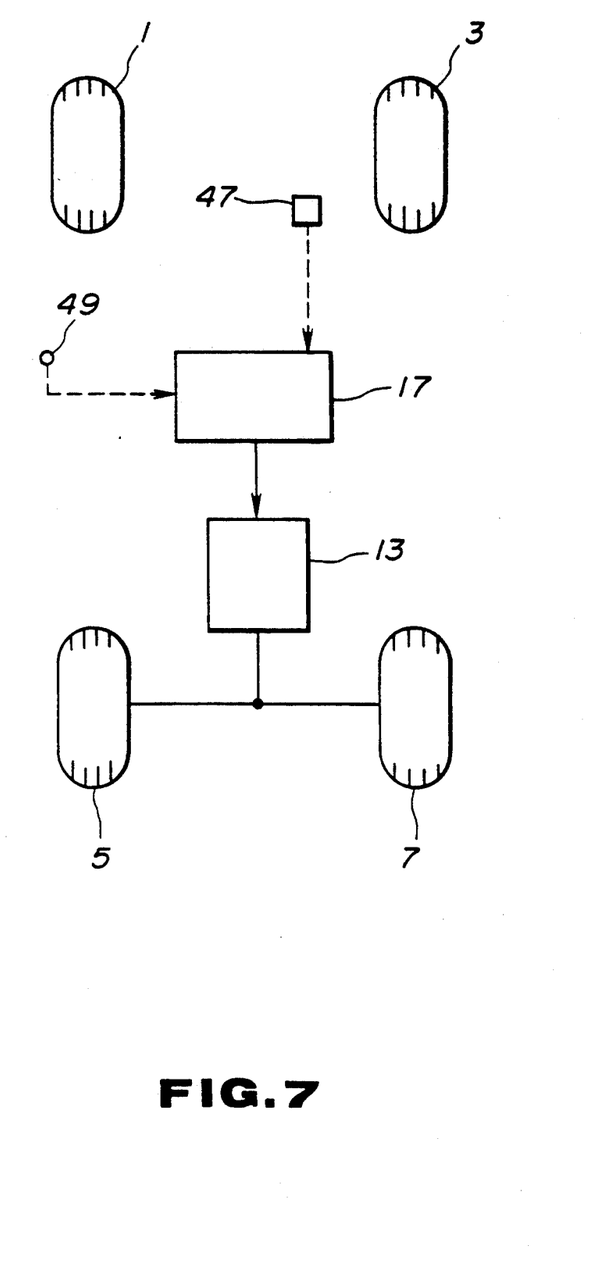
FIG. 7 is an alternative installation of the motor control system in a vehicle.
Figure 8:
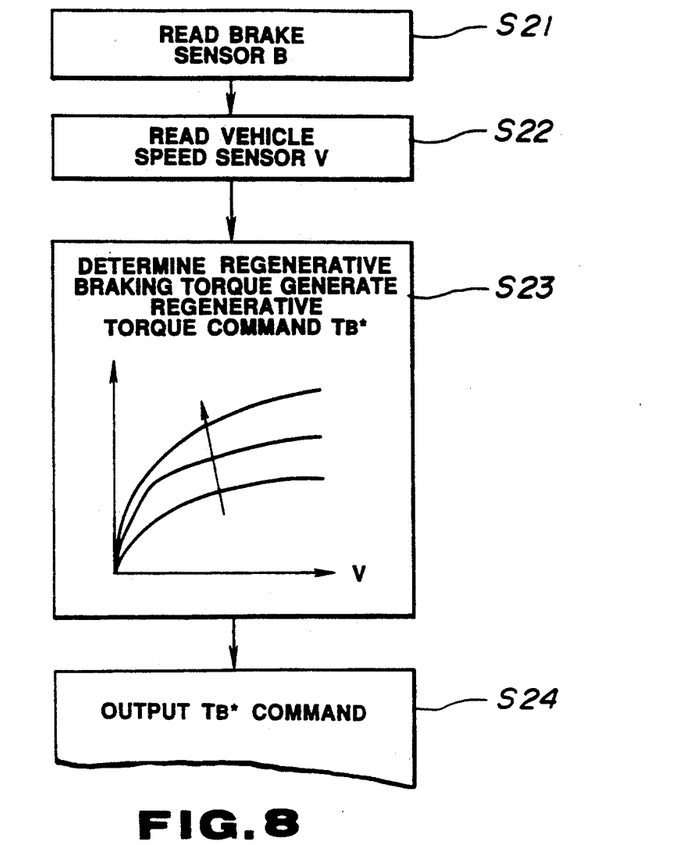
FIG. 8 is a flowchart explaining the functioning of an automatic speed control device (ASCD) according to another embodiment.

FIGS. 7 and 8 show an alternative embodiment of a control system according to the invention. The second embodiment relates to regenerative torque control having ASCD characteristics.

According to the second embodiment, a brake sensor 47 is provided to detect a degree of braking force applied to a vehicle brake (not shown) as well as a vehicle speed sensor 49 to detect a vehicle speed. A program for operation of the system of the second embodiment is shown in FIG. 8.

According to the flowchart of FIG. 8, at a step S21, a signal B from the brake sensor 47 is read. Then, at a step S22, a vehicle speed V is read from the vehicle speed sensor 49. Next, at a step S23, a regenerative torque command $T_B^*$ value is calculated on the basis of the brake signal B and the speed signal V and, at a step S24, a signal representing the regenerative torque command $T_B^*$ is output to the motor 13.

According to the above embodiment, even if, for example, switching between a driving operation wherein the accelerator is depressed, and a regenerative torque operation wherein the brake is operated, is effected suddenly, smooth transition between the two control modes may be effected. Thus driveability and safety are enhanced according to the control system of the invention.

Thus according to the above described embodiments of a control system for electric vehicles, smooth and safe transition may be made between torque control and speed control of an electric motor and ASCD (Automatic Speed Control Device) and LSD (Limited Slip Differential) characteristics may be obtained.

What is claimed is:

1. A control system for a motor of an electric motor vehicle, comprising:
   means for detecting motor speed and outputting a motor speed signal indicative thereof;
   means for detecting a demand for acceleration and outputting an acceleration signal indicative thereof;
   means for calculating a motor speed error based on said motor speed signal and said acceleration signal and outputting a motor speed error signal;
   means for generating a motor speed command based on said motor speed error signal and said motor speed signal and outputting a motor speed command signal indicative thereof;
   feedback control means calculating a torque command value based on said motor speed command signal and said motor speed signal and outputting a torque command signal indicative thereof; and
   control means, controlling said motor on the basis of said torque command signal from said motor speed feedback control means.

2. A control system as set forth in claim 1, further comprising external motor speed command generating means outputting an external motor speed command signal and switching means, operatively connected with said feedback control means and switchable between output signals of said external motor speed command generating means and said motor speed command generating means.

3. A control system as set forth in claim 1, further comprising brake sensing means detecting an applied braking force and outputting a braking signal indicative thereof and vehicle speed sensing means, detecting a vehicle speed and outputting a vehicle speed signal indicative thereof, wherein said motor is controlled on the basis of said vehicle speed signal and said braking signal.

4. A control system for an electric vehicle, comprising:
   a motor;
   a motor rotational speed sensor detecting a rotation speed of said motor and outputting a motor speed signal indicative thereof;
   an accelerator angle sensor detecting a depressed angle of an accelerator of said vehicle and outputting an acceleration command signal;
   error signal generating means receiving said motor speed signal from said motor rotational speed sensor and said acceleration command signal from said accelerator angle sensor and determining a motor speed error and outputting a motor speed correction signal indicative thereof;
   motor speed command generating means, adding said motor speed signal and said motor speed correction signal and outputting a motor speed command indicative of the result of said adding;
   feedback control means forming a feedback loop based on said motor speed command, and said motor speed signal from said motor rotational speed sensor and subtracting the motor speed command from said motor speed signal for deriving a torque command value and outputting a torque command signal indicative thereof; and
   control means, controlling torque of said motor on the basis of said torque command signal output by said feedback control means.

5. A control system as set forth in claim 4, further comprising external motor speed command generating means outputting an external motor speed command signal and switching means, operatively connected to said feedback control means and said external motor speed command generating means for switching between output signals of said external motor speed command generating means and said motor speed command generating means and outputting a motor speed command.

6. A control system as set forth in claim 4, further comprising:
   a steering angle sensor, coupled to said motor speed command generating means for detecting a steering angle of a steering wheel of said vehicle and outputting a steering angle signal indicative thereof;
   wherein said system controls a plurality of motors and said motor speed command generating means respectively controls each motor according to a given steering condition.

7. A control system as set forth in claim 6, further comprising:
   a lateral acceleration sensor detecting lateral acceleration acting on the vehicle when traveling and outputting a lateral acceleration signal indicative thereof for calculating a turning radius of the vehicle, said motor speed command generating means respectively controlling each motor according to a given turning radius.

8. A control system for a vehicle having a steering wheel, at least one steered wheel coupled to and steered by said steering wheel, and an accelerator and at least two drive wheels, said control system comprising:
   at least two motors, each of said at least two motors coupled to one of said two drive wheels;
   a motor rotational speed sensor coupled to said at least two motors for detecting a rotational speed of said at least two motors and outputting a motor speed signal;
   a wheel speed sensor coupled to said at least one steered wheel for detecting a rotational speed of said at least one steered wheel and outputting a steered wheel speed signal;
   a steering angle sensor, for detecting a steering angle of said steering wheel and outputting a steering angle signal;
   a lateral acceleration sensor for detecting lateral acceleration acting on said vehicle and outputting a lateral acceleration signal;
   a motor speed command generating means, coupled to said steering angle sensor and said lateral acceleration sensor for calculating a turning radius of said vehicle and outputting a motor speed command according to the turning radius;
   feedback control means, coupled to said motor speed command generating means and said motor rotational speed sensor, for forming a feedback loop based on the motor speed command and the motor speed signal and subtracting the motor command from the motor speed signal for deriving a torque command and outputting a torque command signal; and
   control means, coupled to said at least two motors and said feedback control means, for controlling torque of said at least two motors on the basis of the torque command signal.

* * * * *